United States Patent
Huber et al.

(10) Patent No.: US 7,245,475 B2
(45) Date of Patent: Jul. 17, 2007

(54) WIDE INPUT VOLTAGE RANGE RELAY DRIVE CIRCUIT FOR UNIVERSAL DEFROST TIMER

(75) Inventors: Terry Lee Huber, Lewisburg, OH (US); Dale Thomas Rodda, Marysville, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 0 days.

(21) Appl. No.: 11/403,426

(22) Filed: Apr. 13, 2006

(65) Prior Publication Data
US 2006/0232907 A1   Oct. 19, 2006

Related U.S. Application Data

(60) Provisional application No. 60/671,194, filed on Apr. 14, 2005.

(51) Int. Cl.
*H02H 3/20* (2006.01)
(52) U.S. Cl. ..................... 361/160; 361/91.1
(58) Field of Classification Search ................. 361/13, 361/14, 18, 91.1, 111, 8, 160
See application file for complete search history.

(56) References Cited

U.S. PATENT DOCUMENTS

| | | | |
|---|---|---|---|
| 4,744,231 A | | 5/1988 | Takagi et al. |
| 4,959,746 A | * | 9/1990 | Hongel .................... 361/13 |
| 5,001,623 A | * | 3/1991 | Magid ...................... 363/143 |
| 5,304,781 A | * | 4/1994 | Stalsberg .................. 219/501 |
| 6,598,604 B1 | * | 7/2003 | Seakins .................. 128/203.17 |
| 6,671,142 B2 | * | 12/2003 | Beckert et al. ............... 361/2 |

\* cited by examiner

*Primary Examiner*—Michael Sherry
*Assistant Examiner*—Danny Nguyen
(74) *Attorney, Agent, or Firm*—Reinhart Boerner Van Deuren P.C.

(57) ABSTRACT

A wide input voltage range relay drive circuit allowing a more than 2:1 input voltage variation is provided. The circuit utilizes a scaled and rectified bulk voltage to drive the relay coil. As the monitored bulk voltage increases beyond the relay coil rated voltage, the circuit pulse width multiplexes this bulk voltage to protect the relay coil. The bulk voltage switching does not begin, however, until the relay energizes. To reduce the power dissipation during the PWM switching of the relay coil, a power dissipating switch is included and held on during the PWM switching events. To further increase relay life, the circuit controls the energizing of the relay coil to actuate the contacts of the relay at or near a zero cross of the power switched thereby.

20 Claims, 2 Drawing Sheets

WIDE INPUT VOLTAGE RANGE RELAY DRIVE CIRCUIT FOR UNIVERSAL DEFROST TIMER

CROSS-REFERENCE TO RELATED PATENT APPLICATIONS

This patent application claims the benefit of U.S. Provisional Patent Application No. 60/671,194, filed Apr. 14, 2005, the teachings and disclosure of which are hereby incorporated in their entireties by reference thereto.

FIELD OF THE INVENTION

The present invention relates in general to defrost timers for use in commercial refrigeration systems, and more particularly to electronic defrost timer relay drive circuits for use in commercial refrigerators to defrost the evaporator coils therein.

BACKGROUND OF THE INVENTION

Commercial refrigerators lose efficiency when ice forms on the evaporator coils. To improve the efficiency the coils are defrosted on a periodic basis. This is accomplished by disabling the compressor and allowing or forcing the temperature of the coils to rise above the freezing temperature to remove the accumulated ice thereon.

This defrost function has been accomplished, in the past, by electromechanical timers that implemented time keeping with an AC synchronous motor clock that drove electrical contacts for the compressor and defrost means through mechanical linkages. The supply voltage requirements of the AC synchronous motor, however, dictated that separate designs or models of the timers be designed for 120 volt AC and 208~240 AC supply voltage systems. Typically, these separate designs utilized different transformers with the appropriate turns ratio or a separate relay with the appropriate specified coil voltage for each input voltage range. As a result, the refrigeration service person was required to carry at least two different models for each service call, at an additional cost to him, in order to be prepared to replace which ever version of timer was installed at the customer location.

Another system that attempts to overcome this dual voltage problem is described in U.S. Pat. No. 6,563,237 to Bootz, for a "Multi-Voltage electromechanical time switch", issued May 13, 2003. This patent describes an electromechanical timer designed to operate at either 120 Volt AC or 240 Volt AC by routing the supply voltage through a resistor divider. The customer is required to adjust the position of jumpers or switches, thereby changing the resistor divider ratio, to configure the timer for either 120 Volt AC or 240 Volt AC operation. Unfortunately, a mistake by the customer during configuration of the switches/jumpers could lead to damage or destruction of the timer.

Another solution for this problem is to use of a regulated DC voltage power supply to drive the relay coil. However, this is a costly approach which, in the highly cost competitive appliance industry, is unacceptable to the end consumer.

Other solution has been to sense the value of the bulk voltage and produce a high frequency pulse width modulated (PWM) signal that is used to drive the relay coil. The value of the duty cycle of the PWM signal is adjusted depending on the value of the bulk voltage so that the average value of the voltage across the coil is equal to its rated value. However, the power dissipated in the Zener diode placed across the relay is directly proportional to the switching frequency of the PWM. Therefore, high switching frequencies required for the coil to average the PWM signal translate to the requirement for high power, expensive Zener diodes. As such, this solution also undesirably increases the cost for the end consumer.

There exists, therefore a need in the art for a defrost timer mechanism that will operate at both 120 Volt and 208-240 Volt AC supply voltages without requiring user intervention.

BRIEF SUMMARY OF THE INVENTION

In view of the above, it is an objective of the present invention to provide a new and improved universal defrost timer that overcomes the above described and other problems existing in the art. More specifically, it is an objective of the present invention to provide a new and improved universal defrost timer that utilizes an electronic microprocessor controlled timer that is capable of operating over a supply voltage range of 120 Volt AC to 240 Volt AC (nominal) with no customer configuration or moving of wires, jumpers, etc. required. Still more particularly, it is an objective of the present invention to provide a new and improved circuit and method for driving an electromagnetic relay with a voltage applied to the relay coil that varies over a greater than two to one range.

In an embodiment of the present invention, the universal defrost timer provides multi-voltage operation from approximately 102 Volts AC to 260 Volts AC, 50/60 Hertz (normally 120-240 Volts AC, 50/60 Hertz), and utilizes the same electrical terminals for the power input without requiring any jumpers. In a highly preferred embodiment the universal defrost timer of the present invention utilizes an analog power supply, and other circuitry, that utilizes pulse width modulation (PWM) to allow the use of a single set relays over the entire voltage input supply. This embodiment maintains fast relay switching from one state to the other to promote long relay life at large loads. In a further embodiment, load current zero crossing anticipation is implemented to define the time of switching.

In a preferred embodiment, the wide-ranging input voltage is scaled and rectified to form a loosely regulated DC voltage, which is used to drive the defrost heater control relay. However, since the input voltage may be much higher than the relay could withstand without damage, the circuit and method of this embodiment pulse width modulates this bulk voltage to the relay coil. Initially, the bulk voltage is applied to the coil to ensure rapid switching of the relay. Thereafter, the voltage signal to the relay is pulse width modulated to prevent damage thereto. To minimize power dissipation during the PWM switching, and hence reduce the cost thereof, a power switching device having a low on resistance is used to prevent current from flowing through the coil-protecting Zener while the relay is energized.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
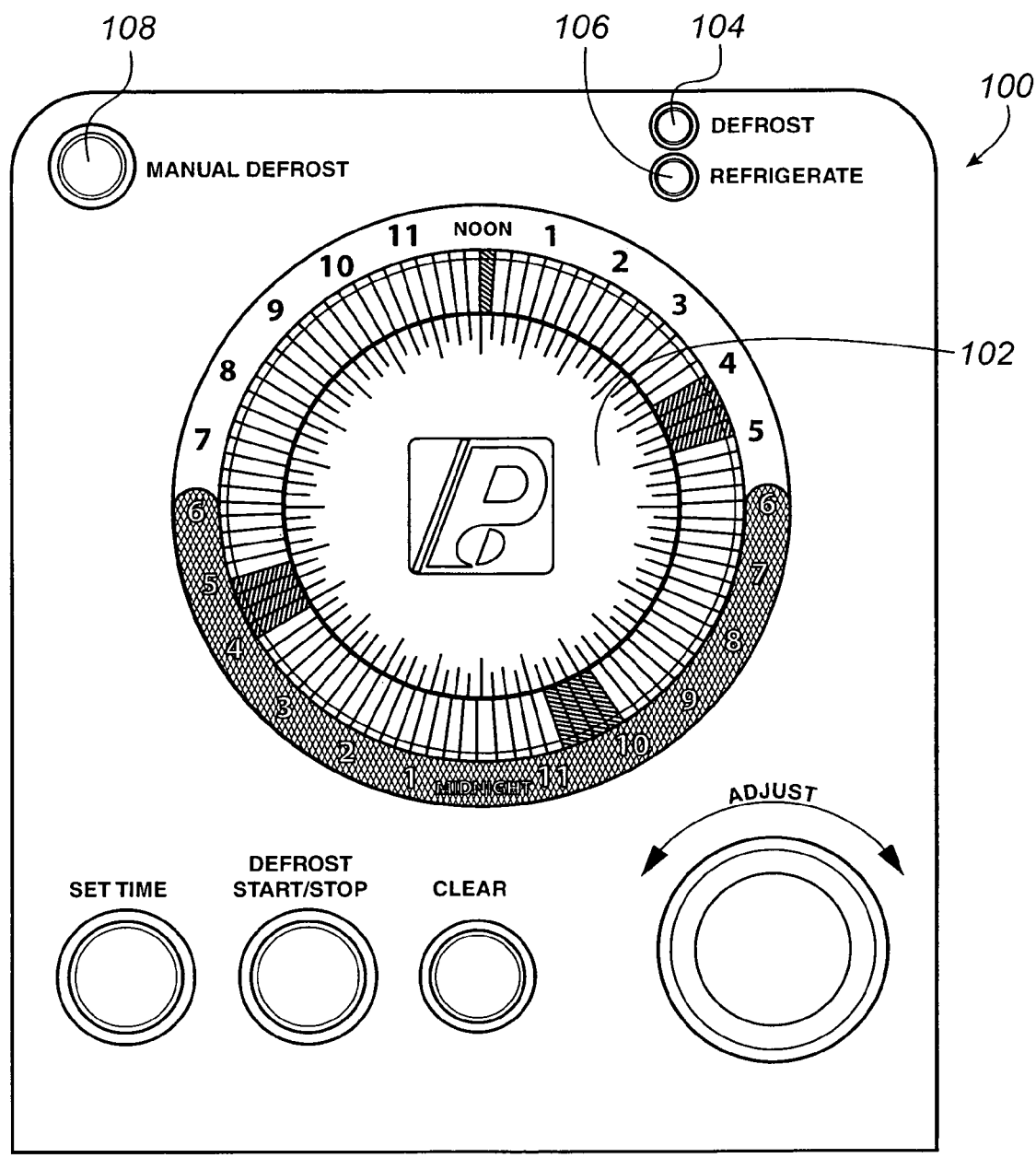
FIG. 1 illustrates a front view of the universal defrost timer (UDT) of the present invention.

A Universal Defrost Timer (UDT) 100 into which the circuit and method of the present invention are particularly well suited is illustrated in FIG. 1. This UDT 100 is designed to accept power supply voltages of 120 VAC, 208 VAC or 240 VAC directly connected to the power terminals (not shown) without requiring jumpers or switches. As illustrated, the front face of the UDT 100 includes a backlit, dial style clock face 102 that makes the device easy to see in dimly lit environments and is designed to mimic the look and feel of the traditional defrost time clock. Operation of the defrost cycles are controlled based on an internal real-time clock, and provides a simple defrost schedule setup. System status indicator lights 104, 106 provide positive feedback to operators and make it easy for service technicians to verify the mode of operation. A manual defrost initiation button 108 allows such an operator to initiate a manual defrost cycle or an emergency defrost. A more complete description of such a UDT 100 and its functions may be found in co-pending U.S. application Ser. No. 11/403,427, filed on even date herewith, entitled Universal Defrost Timer, and assigned to the assignee of the instant application, the teachings and disclosure of which are incorporated herein in their entireties by reference thereto.

The Universal Defrost Timer 100 can be applied to refrigeration systems requiring regularly scheduled defrosting of the evaporator coil. Typical defrost methods that may be controlled by the UDT 100 of the present invention include off cycle, electric or hot gas. Typical applications include reach-in coolers and freezers and walk-in coolers and freezers in commercial applications such as grocery stores, convenience stores, etc. and in the foodservice (restaurant, institutional, healthcare) markets. The UDT 100 of the present invention also finds use in aftermarket applications driven by emergency service, where the service contractor is called following an equipment failure.

The illustrated embodiment of the Universal Defrost Timer 100 differs from competitive products in that it is designed to withstand the rigors of refrigeration applications. It is listed under UL standard 873 as a temperature regulating device. UL873 is much more stringent a standard than UL917 (clock operated switch) which is where typical defrost timer products are listed.

One of the advantages that the circuit and method of the present invention provides is that it allows contractors to carry a single timer on their truck to meet the requirements of most refrigeration applications. Contractors can wire the UDT 100 directly to 120 VAC, 208 VAC or 240 VAC without the worry of correctly installing jumpers or properly positioning a switch. Indeed, this embodiment of the UDT 100 operates properly without any user configuration when subjected to the following ranges of input voltage: 102 $V_{AC}$ min to 132 $V_{AC}$ max; 187 $V_{AC}$ min to 264 $V_{AC}$ max.

By offering a single replacement model, the UDT 100 will greatly reduce the number of separate parts (SKUs) that contractors/wholesalers need to carry on a service truck, in a warehouse, and reduce the number of orders they need to place. The benefit is that the wholesaler and contractor is much more likely to have the proper product with them at time of greatest need. This reduces both the space required and the carrying charges associated with the product.

In one embodiment, the UDT 100 provides two/one single pole single throw (SPST) relays output rated as follows: 30A Resistive @ 120 $V_{ac}$ to 240 $V_{ac}$. 1 HP @ 120 $V_{ac}$, 2 HP @ 208 $V_{ac}$ to 240 $V_{ac}$. An alternate embodiment of the UDT 100 provides one single pole double throw (SPDT) relay output rated as follows: 30A Resistive @ 120 $V_{ac}$ to 240 $V_{ac}$. 1 HP @ 120 $V_{ac}$, 2 HP @ 208 $V_{ac}$ to 240 $V_{ac}$.

In the first embodiment the output relays consist of one SPST NC relay connected between two terminals, and one SPST NO relay connected between two other terminals. When the UDT 100 is in the refrigeration mode the SPST NC relay is closed and the SPST NO relay is open. When the UDT 100 enters the defrost mode, the SPST NC relay opens and the SPST NO relay closes. Preferably, time terminated defrosts are provided by this embodiment. Additional functionality, beyond that of the electromechanical defrost timers, includes the ability to initiate a fifteen minute manual defrost at any time (except during another manual defrost and subject to Short Cycle requirements), variable defrost duration times for each set defrost, and LED indicators that indicate when the timer is in the refrigeration or defrost cycles.

In the second embodiment, the output relays include one SPDT relay connected between three terminals, and one SPST NC relay connected between two other terminals. When the UDT is in the refrigeration mode the SPDT relay is closed between two of the terminals and the NC relay is closed between two other terminals. When the UDT enters the defrost mode the SPDT relay opens between two terminals and closes between two other terminals, and the SPST NC relay opens. Both time and temperature/pressure terminated defrosts are allowed with this embodiment. A defrost can be terminated by temperature/pressure through the use of a temperature or pressure sensing switch that connects the AC line voltage to terminal "G" when the defrost is complete. The defrost will also terminate at the programmed defrost duration time if the temperature/pressure switch has not previously terminated it.

Having described one embodiment of a UDT to which the circuit and method of the present invention finds particular applicability, the following will discuss the circuit and method that allows operation over a wide supply voltage range, e.g. from 120 volt AC to 240 volt AC. In one embodiment of the present invention, this capability is provided by a linear power supply capable of operating over this entire range. In addition, relays specified at a single DC coil drive voltage are used over this full voltage range. In order to increase power supply efficiency, these relay coils are driven by the "bulk," not the regulated DC voltage from the power supply as will be described more fully below. When the AC supply voltage is at its minimum value, the bulk voltage is also at its minimum value. Therefore, the specified coil drive voltage is selected to be equal to this minimum value of the bulk voltage.

Before describing the circuit and method of the present invention in detail, it is instructive to discuss various properties of the relays that are driven by this circuit and method. Electromagnetic relays are used in many electrical/electronic devices as a means for switching both alternating current (AC) or direct current (DC) loads. One version of electromagnetic relays utilizes a small DC current flowing though a magnetic coil to move an armature from one set of contacts to another. The large load current flowing through the armature is thus switched from the first set of contacts to the second. A constant value of DC current greater than a specified value is required to flow through the coil in order to move the armature from the first set of contacts to the second. A value of DC current less than a second specified value allows the armature to switch back to the first set of contacts. These electromagnetic relays are therefore manufactured and specified to operate with a given DC voltage applied across the coil that produces a current through the coil somewhat greater than the current required to move the armature. Relays are manufactured to operate at standard DC voltage values of from 5 VDC to 48 VDC. Coil voltages greater than 125% of the specified value would typically cause the coil of the relay to fail if they were to be applied continuously.

For many electrical/electronic devices, the relay coil current is the largest current that needs to be supplied from the DC power supply. Due to the cost of using a regulated voltage to supply this current, the relay coil drive current is usually drawn from the bulk voltage. This bulk voltage is generated by sending the AC input voltage for the device through a transformer to reduce its value, then rectifying and filtering it to produce a loosely regulated DC voltage. The value of the DC bulk voltage is proportional to both the value of the AC input voltage and the transformer turns ratio.

In order to enable the electrical/electronic device to operate in many countries and because of the variation of the amplitude of the AC input voltage over time, it is desirable for the device to operate over as wide a range of AC input voltages as possible. This means that the DC bulk voltage will have a wide range of values which conflicts with the coil voltage requirements of the electromagnetic relay.

For electromagnetic relays carrying large load currents, it is desirable, for improved life, to have the contacts switch as in as short a time as possible. The contact switching time is related to the decay time of the coil current. That is, the faster the current rises or decays, the faster the contacts switch. In order to increase the life of the relay when it is carrying larger load currents, such as a defrost heater load, a Zener diode is often placed across the coil in such a manner that, when the coil current is turned off, the collapsing field of the coil inductance causes the Zener to become biased at its rated value as mentioned above. This high value of voltage causes the current in the coil to decay faster than if the Zener were replaced by a normal silicon diode, thereby improving the life of the relay.

Figure 2:
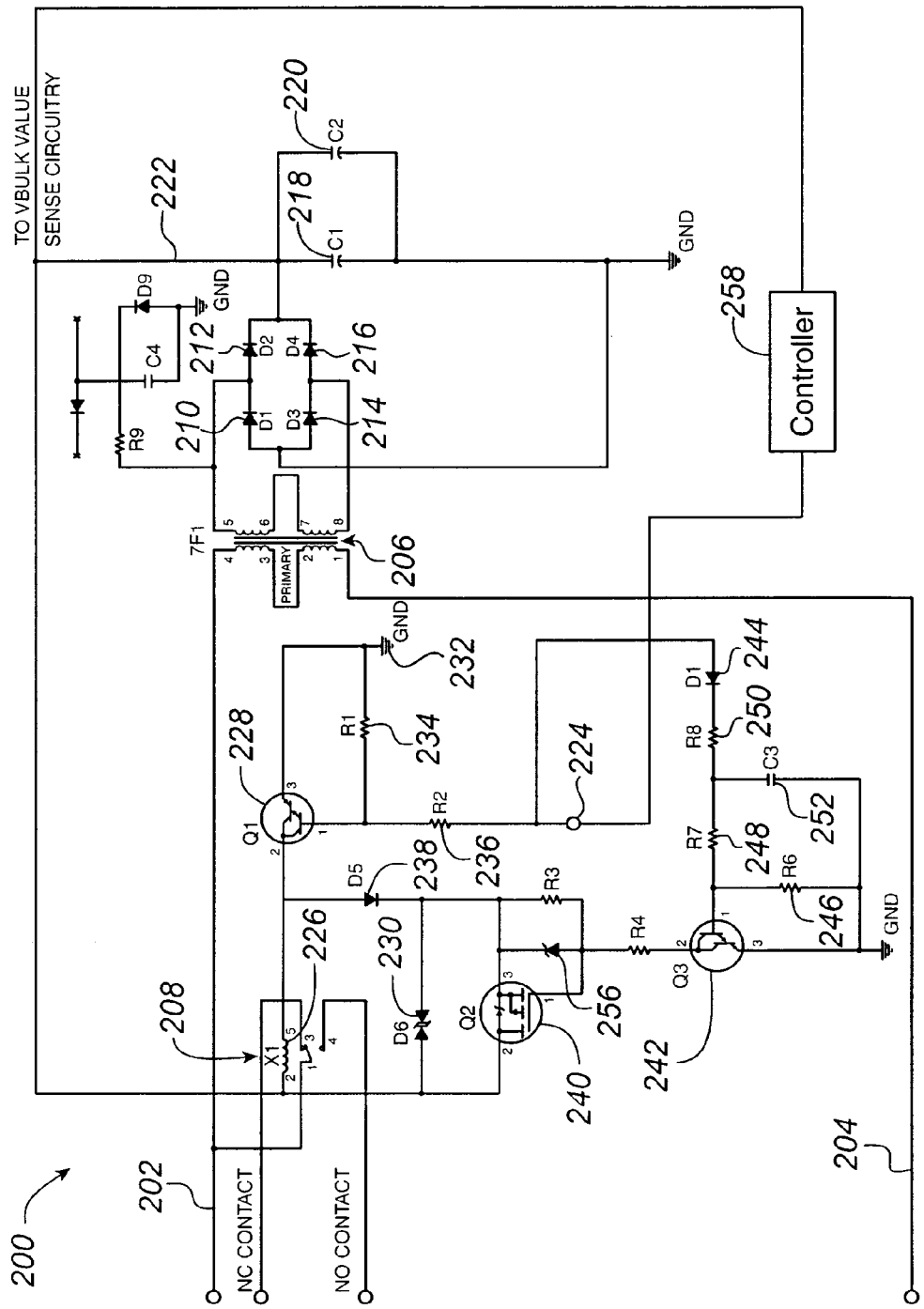
FIG. 2 is a simplified single line schematic diagram of one embodiment of the linear power supply of the present invention.

With these properties in mind, the circuit of the present invention, an embodiment of which is illustrated in FIG. 2, utilizes a controller 258, such as a microprocessor, microcontroller, programmable logic device (PLD), etc. to sample the value of the bulk voltage at a periodic rate. If the voltage sensed is the minimum value of the bulk voltage, it is applied continuously to the relay coil during the time that the relay is meant to be energized. Since the relay coil is rated for this value, there is no possibility that the relay coil could be damaged by this applied voltage. However, since the value of the bulk voltage is linearly related to the value of the AC supply voltage, the value of the bulk voltage will be more than two times the minimum value when the AC supply voltage is at its maximum value.

Unfortunately, values of bulk voltage greater than 125% of the minimum value would typically cause the coil of the relay to fail if they were to be applied to the relay coil continuously. Therefore, when the controller 258 senses a bulk voltage value that could damage the relay coil, it first applies this voltage to the coil for a time period long enough to ensure that the relay energizes quickly, but not long enough to damage the relay. The bulk voltage drive to the coil is then turned on and off at a given rate, but with the correct duty cycle to produce an average value of voltage applied to the coil equal to the specified drive voltage. The applied frequency is at a high enough value that the inductance of the relay coil averages the duty cycle.

In addition to controlling the voltage applied to the coil to protect the relay coil from damage, the relay contacts can also be protected and relay contact life can be increased by switching the relay contacts when the voltage across the relay contacts is at zero or decreasing towards zero. By knowing the frequency of the applied AC power and the time the relay contacts take to switch, the controller 258 anticipates the optimal time to switch the relay on or off. For example, in a system with 60 HZ ac power, zero crossings occur every 8.3 ms. Given a 2 ms relay switching time, the signal driving the relay should be initiated at 6.3 ms after a zero crossing. This anticipation of the next zero cross will allow the relay contacts to switch at the optimum time for maximum relay contact life. In view of this benefit to relay contact life, and therefore the overall reliability of the defrost control system, the circuit and method of the present invention tightly controls the power applied to the relay coil. With less variation in the voltage applied to the relay coil, the relay contact switching times are maintained within a tight tolerance.

With specific reference now to FIG. 2, a simplified single line schematic drawing showing one embodiment of this relay drive circuit 200 is provided. AC line 202 and neutral 204 voltages are input to the primary side of transformer 206 and to the common terminal of the SPDT relay 208, which is used to switch high power AC loads such as the defrost heater, etc. The secondary of transformer 206, along with the bridge rectifier formed by diodes 210, 212, 214 and 216, and the filter capacitors 218 and 220 generate a loosely regulated DC voltage, VBULK, on line 222. The value of this bulk voltage is proportional to the amplitude of the AC input voltage and to the transformer turns ratio. The amplitude of VBULK, therefore, will vary over a wide range, typically more than 2 to 1 in the environment described above. VBULK can also be input to a voltage regulator to generate a more regulated voltage used to power other circuitry such as a microprocessor as desired.

The value of VBULK is sensed so that the correct PWM duty cycle may be calculated based on the value of that voltage. Once this has been calculated, the PWM RELAY DRIVE signal is generated and applied to point 224 of the circuit 200. PWM RELAY DRIVE signal swings between voltage levels generated by the regulated voltage, such as ground and +5V, used to power this circuitry 258.

Relay 208 is chosen to be able to handle the AC loads it is meant to switch as well as to have a specified coil voltage slightly less than the minimum value of VBULK. The coil 226 of relay 208 is connected between VBULK and the collector of transistor 228. Transistor 228 is operated as a saturated switch and is turned on and off at the PWM frequency signal applied to point 224, with the duty cycled calculated for the sensed value of VBULK. Transistor 228 is also chosen so that its collector-emitter breakdown voltage exceeds the maximum value of VBULK plus the voltage of Zener 230. The emitter of transistor 228 is connected to the ground 232. The base of transistor 228 is driven through resistors 234 and 236 by the PWM RELAY DRIVE signal at point 224.

In one embodiment of the present invention, diode 230 is a 33V bidirectional transient voltage suppressor. This is a bidirectional device, however a unidirectional Zener diode could also be used in alternate embodiments. The switching time of the relay armature is directly dependent on the decay time of the relay coil current and the relay life is inversely related to the armature switching time. The breakdown voltage of diode 230 is chosen to ensure fast decay time, for example one millisecond, and therefore, long relay life at high load currents. The switching frequency of PWM RELAY DRIVE 224 is chosen to be high enough, for example 20 KHz, to be out of the audible range so as not to cause an annoying tone. At this high frequency value, diode 230 will conduct the coil current, for example 60 mA for a 12 VDC coil, for a portion of every 50 μsec PWM period. For a common duty cycle of 50%, the average power dissipated in diode 230 would be equal to $P_{D6}$=(33V*0.06A)*25 μsec*20,000/1 sec=0.99 W. At that average power level, an expensive 5 W power diode would be required to maintain the junction temperature at a low enough value to ensure high reliability. This would be undesirable, as it would increase the cost of the circuit.

However, diode 238 prevents current conduction through diode 230 when transistor 228 is turned on. Transistor 240 is a P channel power MOSFET chosen for its low on resistance (for example 1.2Ω), high speed, and drain to source breakdown voltage in excess of the maximum value of VBULK plus the voltage of Zener 230. Transistor 242 is saturated by the rising edge of the PWM RELAY DRIVE signal just as transistor 228 is. This turns on transistor 240. However, unlike transistor 228, the diode filter combination of diode 244, resistors 246, 248, 250, and capacitor 252 holds transistor 242, and therefore transistor 240 on through the whole PWM period. Therefore, the coil decay current flows through transistor 240 rather than diode 230 as long as the relay 208 is energized. The low on resistance of transistor 240 generates a much lower power dissipation for the given current than would diode 230. As such, there is no need for such an expensive power diode.

The relay 208 is de-energized by the PWM RELAY DRIVE signal 224 when it is no longer pulsing and returning to ground. The time constant of resistor 248 and capacitor 252 guarantees that transistor 242 and transistor 240 will turn off within 100 μsec of PWM RELAY DRIVE remaining constantly at ground. This allows the coil decay current to flow through diode 230, thereby decreasing the relay switching time and increasing the reliability and life of the relay. The purpose of Zener diode 256 is to limit the maximum gate to source voltage of transistor 240 to a value less than the maximum allowed value.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A relay drive circuit for driving a relay having a coil with a rated coil voltage from an input voltage that exceeds the rated coil voltage, comprising:
   a transformer-rectifier for generating a bulk voltage from the input voltage to drive the coil;
   an electronically controlled switching device operatively coupled to energize the coil with the bulk voltage when in a conducting state;
   a Zener diode coupled across the coil;
   a power dissipating electronic switching device coupled across the Zener diode; and
   a controller operatively coupled to the switching device and the power dissipating electronic switching device, the controller monitoring the bulk voltage; and
   wherein the controller enables the switching device to energize the coil for a first period sufficient to ensure actuation of the relay and to prevent damage to the coil based on the bulk voltage; and
   wherein the controller thereafter modulates the switching device to maintain energization of the coil and to prevent damage thereto when the bulk voltage is greater than the rated coil voltage.

2. The circuit of claim 1, wherein the power dissipating electronic switching device is enabled when the controller modulates the switching device to maintain energization of the coil and to prevent damage thereto when the bulk voltage is greater than the rated coil voltage to reduce power dissipation by the Zener diode during modulation of the switching device.

3. The circuit of claim 2, further comprising a switching control circuit operatively coupled to the controller to energize the dissipating electronic switching device when the controller modulates the switching device.

4. The circuit of claim 3, wherein the switching control circuit comprises a transistor and a filter circuit having a time constant longer than a period of modulation of the switching device, the switching control circuit disabling the dissipating electronic switching device after modulation of the switching device has ended.

5. The circuit of claim 1, wherein the Zener diode is a bidirectional transient voltage suppressor.

6. The circuit of claim 1, wherein the power dissipating electronic switching device is enabled during and for a second period after the controller enables the switching device to reduce power dissipation by the Zener diode after the first period.

7. The circuit of claim 1, wherein the power dissipating electronic switching device is a P channel metal oxide silicon field effect transistor (MOSFET).

8. The circuit of claim 1, wherein the transformer-rectifier includes at least one filter capacitor for the bulk voltage.

9. The circuit of claim 1, wherein the controller monitors a voltage to be switched by the relay for zero crosses, and wherein the controller enables the switching device to energize the coil at a time calculated to result in actuation of the relay in temporal proximity to a zero cross of the voltage or current to be switched by the relay.

10. The circuit of claim 9, wherein the voltage to be switched is the input voltage, and wherein the controller monitors the input voltage for zero crosses.

11. A circuit for switching an AC input voltage to a load, comprising:
 a relay having a coil and at least one of a normally open or a normally closed contact;
 a transformer-rectifier configured to generate a bulk voltage from the AC input voltage to drive the coil;
 an electronically controlled switching device operatively coupled in circuit with the coil to actuate the relay with the bulk voltage;
 a power dissipating electronic switching device coupled across the coil; and
 a controller operatively coupled to the switching device and the power dissipating electronic switching device, the controller further operatively coupled to the transformer-rectifier to monitor the bulk voltage generated thereby; and
 wherein the controller enables the switching device to energize the coil for a first period long enough to ensure actuation of the relay but short enough to prevent damage to the coil, the first period being dependent on a value of the bulk voltage.

12. The circuit of claim 11, wherein the controller modulates the switching device after the first period when the value of the bulk voltage is greater than a rated coil voltage by a predetermined amount to maintain actuation of the relay and to prevent damage to the relay coil.

13. The circuit of claim 12, further comprising a Zener diode coupled across the coil, and wherein the power dissipating electronic switching device is enabled when the controller modulates the switching device to reduce power dissipation by the Zener diode during modulation of the switching device.

14. The circuit of claim 11, further comprising a switching control circuit operatively coupled to the controller to energize the dissipating electronic switching device when the controller enables the switching device.

15. The circuit of claim 14, wherein the switching control circuit comprises a transistor and a filter circuit having a time constant that maintains the energization of the dissipating electronic switching device for a time after the controller no longer enables the switching device.

16. The circuit of claim 14, further comprising a Zener diode coupled across the coil, and wherein the power dissipating electronic switching device is enabled when the controller modulates the switching device to reduce power dissipation by the Zener diode during modulation of the switching device, wherein the switching control circuit maintains the energization of the dissipating electronic switching device during modulation of the switching device, the switching control circuit disabling the dissipating electronic switching device after modulation of the switching device has ended.

17. The circuit of claim 11, wherein the controller monitors the input voltage for zero crosses, and wherein the controller enables the switching device to energize the coil at a time calculated to at least one of close or open the at least one normally open or normally closed contact, respectively, in temporal proximity to a zero cross of the input voltage.

18. A method of switching a widely varying voltage with a relay, comprising the steps of:
 rectifying the widely varying voltage to form a bulk voltage;
 sensing the bulk voltage;
 determining a period sufficient to ensure actuation of the relay but short enough to prevent damage to the coil based on a magnitude of the bulk voltage;
 applying the bulk voltage to a relay coil for the period; and thereafter
 when the magnitude of the bulk voltage is greater than the rated coil voltage, modulating the bulk voltage to the relay coil to maintain energization of the coil and to prevent damage thereto.

19. The method of claim 18, further comprising the steps of turning on a low impedance power dissipating device coupled across the coil during the step of modulating the bulk voltage to the relay coil.

20. The method of claim 18, wherein the step of applying the bulk voltage to the relay coil comprises the steps of:
 monitoring the widely varying voltage to determine a time between zero crosses;
 calculating a time to apply the bulk voltage after a monitored zero cross based on relay actuation time and the time between zero crosses; and
 applying the bulk voltage to the relay coil at the time to at least one of close or open a relay contact, respectively, in temporal proximity to a zero cross of the widely varying voltage.

* * * * *